UNITED STATES PATENT OFFICE.

JOHANNES WALTER, OF BASLE, SWITZERLAND, ASSIGNOR TO JOHN R. GEIGY & CO., OF SAME PLACE.

AZO COLOR.

SPECIFICATION forming part of Letters Patent No. 431,297, dated July 1, 1890.

Application filed October 24, 1888. Serial No. 289,071. (No specimens.)

*To all whom it may concern:*

Be it known that I, JOHANNES WALTER, of Basle, Switzerland, have invented a certain new and useful Process for the Production of Yellow to Brown Colors of Alizarine-Like Properties, of which the following is a specification.

This invention has reference to the production of new colors, and is based upon the discovery that yellow to brown colors are obtained by treating with nitric acid the products derived by combination of aromatic oxy acids with diazotized aromatic amines.

To carry out the invention I dissolve, for instance, twelve kilos of aniline (or corresponding quantity of toluidine or naphthylamine) in thirty-six kilos of muriatic acid and three hundred liters of water at a temperature of 5° centigrade. Nine kilos of nitrite of sodium are added. The solution of diazobenzole chloride thus obtained is poured while stirring in an alkaline solution of seventeen kilos of salicylic acid or the corresponding quantity of ortho or para kresotinic acid, oxynaphthoic acid, or resorcin carbonic acid. The resulting product is precipitated with acid and filtered. Forty-five kilos of the dry product of the combination is dissolved in one hundred and thirty-five kilos sulphuric acid. A mixture of twenty kilos of nitric acid and fifteen kilos of sulphuric acid is slowly added. Some time afterward the liquid is poured in water, then collected upon a filter, washed, and brought in the form of a paste.

All the simple azo colors are composed by two parts bound to each other by the group NN. Thus they have the formula ANNP. They are made by diazotation of an aromatic amine, (ANH$_8$,) whereby diazochloride (ANNA) is formed. This has to be combined with the part B, which can be an aromatic amine or phenol, (an aromatic oxy compound), or an oxy carbonic acid.

In British patent to Nietzki, No. 17,583 of 1887, the process requires the use for the part B salicylic acid. Nietzki's A is nitro-aniline and mine aniline. The compound I obtain has afterward to be treated with nitric acid. Both colors contain a nitro group; but in Nietzki's case it must be in the part A, while in my case very likely in the part B, which is salicylic acid. It is known that aromatic oxy compounds—such as salicylic acid—are much easier nitrated than amines. It has not been possible as yet to give a direct proof, as all the products obtained by decomposition of nitrated azo components are too unstable, and as nitrated salicylic acid is not easily to be combined with diazobenzol.

Formula for the foregoing is $C_3N_2O_3H_9NO_2$.

Having thus described my invention, what I claim as new, and desire to secure by Letters Patent, is—

The herein-described process for producing yellow to brown colors by first dissolving aniline in muriatic acid and water. When heated to a proper degree, I add nitrite of sodium. This solution is poured while stirring in an alkaline solution of salicylic acid. The whole is then precipitated with acid and filtered. The dry product of the combination is dissolved in sulphuric acid. Then a mixture of nitric acid and sulphuric acid is slowly added. The liquid thus obtained is poured in water, then collected upon a filter, washed, and brought in the form of a paste, substantially as herein described.

In testimony whereof I hereunto sign my name in the presence of two subscribing witnesses this 25th day of September, 1888.

JOHANNES WALTER.

Witnesses:
GEORGE GIFFORD,
CHARLES A. RICHTER.